Sept. 11, 1962     S. MEURER     3,053,238
INTERNAL COMBUSTION ENGINE
Filed April 20, 1961     3 Sheets-Sheet 1

INVENTOR
Siegfried Meurer

BY Bailey, Stephens & Huettig
ATTORNEYS

Sept. 11, 1962 S. MEURER 3,053,238
INTERNAL COMBUSTION ENGINE
Filed April 20, 1961 3 Sheets-Sheet 2

INVENTOR
Siegfried Meurer
BY
Bailey, Stephens & Huettig
ATTORNEYS

Sept. 11, 1962   S. MEURER   3,053,238
INTERNAL COMBUSTION ENGINE
Filed April 20, 1961   3 Sheets-Sheet 3

INVENTOR
Siegfried Meurer
BY Bailey, Stephens & Huettig
ATTORNEYS

United States Patent Office 3,053,238
Patented Sept. 11, 1962

3,053,238
INTERNAL COMBUSTION ENGINE
Siegfried Meurer, Nurnberg, Germany, assignor to Maschinenfabrik Augsburg-Nurnberg A.G., Nurnberg, Germany
Filed Apr. 20, 1961, Ser. No. 104,303
Claims priority, application Germany Apr. 27, 1960
9 Claims. (Cl. 123—32)

This invention is directed to an internal combustion engine in which the combustion chamber into which liquid fuel is injected is separated from the cylinder space containing the piston. The combustion chamber receives between 40 and 100% of the combustion air toward the end of the piston compression stroke, and the chamber communicates with the cylinder space by one or more ports for directing the intake air flowing into the chamber. The liquid fuel can be either injected directly into the combustion air in the chamber or can be injected as a film against the wall of the chamber and vaporized therefrom.

The combustion chamber is cylindrical or polygonal in shape with flat end walls. Because the intake air is tangentially introduced through the ports into the chamber, a strong air swirl is formed in the chamber. As in a centrifuge, such air swirl produces large centrifugal forces which lead to a separation of the lighter and heavier gas particles in the chamber. For example, when a fuel particle is injected into the air swirl, the particle tends to deviate from its injected path and, by reason of the air swirl, to fly into a tangential path since it does not possess a mass density which is essentially greater than the rotating air. When this particle vaporizes and the thus created gas is ignited, the temperature rises and the mass density becomes smaller than that of the surrounding air.

In this invention, passage means are provided for removing the lighter gases in the core of the combustion chamber and lying within the range of the axis of the air swirl. As the passage means extends from the combustion chamber to the cylinder space, provision is made that the compressed intake air does not enter the combustion chamber through the passage means to such extent that it would disturb to a considerable degree the air swirl formed in the combustion chamber for producing the gaseous fuel being burned. This is done by making the overall cross-section of the passage means smaller than the intake air port tangentially entering the chamber, with the best ratio being from 1 to 1.5.

By so doing, the gas flow from the combustion chamber into the cylinder space can take place from the axis of the air swirl in the chamber at the beginning of the piston compression stroke. The fuel particles which are but partially burnt and still need oxygen for complete combustion are to be forced into the cylinder space in time for complete combustion.

This invention can be applied to various internal combustion engines as, for example, to a rotary piston engine. In this case, the cross-section of the passage means opening into the cylinder space is smaller when in the plane perpendicular to the packing strip than when in the plane parallel to the strip.

The invention is also applied to a reciprocating piston engine in which the combustion chamber is positioned in the piston head. In this case, one or more air intake ports are formed as channels extending from the surface of the piston head into the combustion chamber. These channels are arranged around the axis of the chamber, such axis preferably being concentric with a circle perpendicular to said axis. The channels open into the combustion chamber on the circumference of this circle tangentially thereto so that, during the compression stroke, an air swirl is created around the axis of the chamber. One or more channels can serve simultaneously for the injection of the liquid fuel into the chamber. However, a separate fuel injection channel can be provided solely for the injection of the fuel. Passage means in the form of a cylindrical opening co-axial with the axis of the air swirl in the chamber extends from the chamber to the surface of the piston. This neck-like cylindrical opening has such a small diameter as to barely fulfill the purpose of providing a passage for gases coming from the core of the chamber into the cylinder space. The main air intake channels can be either straight or curved in the shape of a spiral. When a spiral shape is employed, it is then advisable to use a separate channel for the introduction only of the liquid fuel.

The means by which the objects of the invention are obtained are disclosed more fully with reference to the accompanying drawings, in which.

Figure 1:
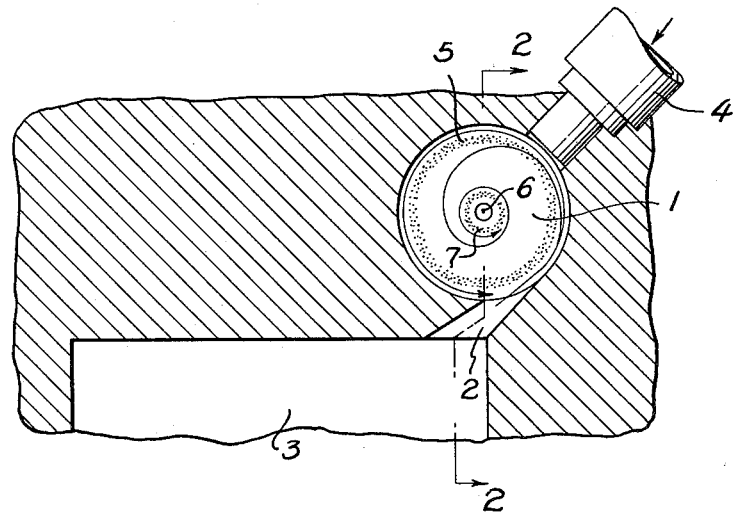
FIGURE 1 is a cross-sectional view through a combustion chamber according to this invention.
Figure 2:
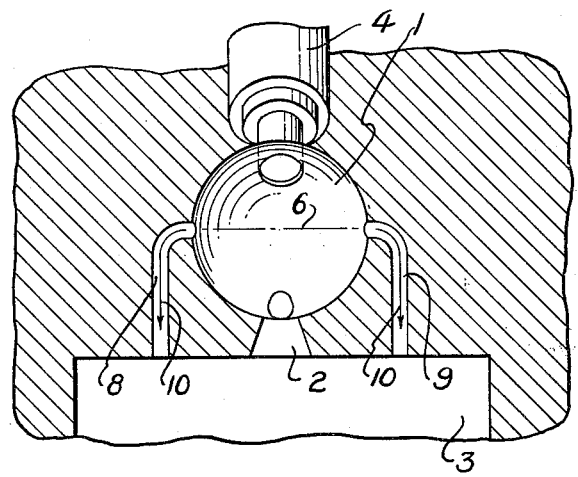
FIGURE 2 is a cross-sectional view taken on the line 2—2 of FIGURE 1.

As shown in FIGURES 1 and 2, the cylindrical combustion chamber 1 communicates through port 2 with the cylinder space 3 in which the piston reciprocates. Port 2 tangentially enters space 3. When air compressed by the piston flows through port 2 into chamber 1 and fuel is injected from fuel nozzle 4 into the chamber, a separation of the heavier and lighter portions of the gas as well as the particles of fuel takes place because of the strong air swirl formed in the chamber by the tangential entrance of the air due to the centrifugal forces thereby created. This separation occurs in such a manner that the less heated heavier air and the heavier fuel particles collect in the periphery 5 of the air swirl. On the other hand, the lighter gas portions and fuel particles, as, for example, the burning fuel particles and intensely heated gas portions, are driven toward the axis 6 of the core 7 of the air swirl.

In this invention, outlet passage means composed of secondary conduits 8 and 9 lead from the vicinity of the core 7 of the chamber 1 and extend into the cylinder space 3. As shown, the openings of the conduits 8 and 9 into the chamber 1 are co-axial with the axis 6. Through these conduits, the particles which are only partially burned at the beginning of the piston compression stroke can flow in the direction of the arrows 10 into the cylinder space 3 and there be completely burned during the primary burning of the gases.

Figure 3:
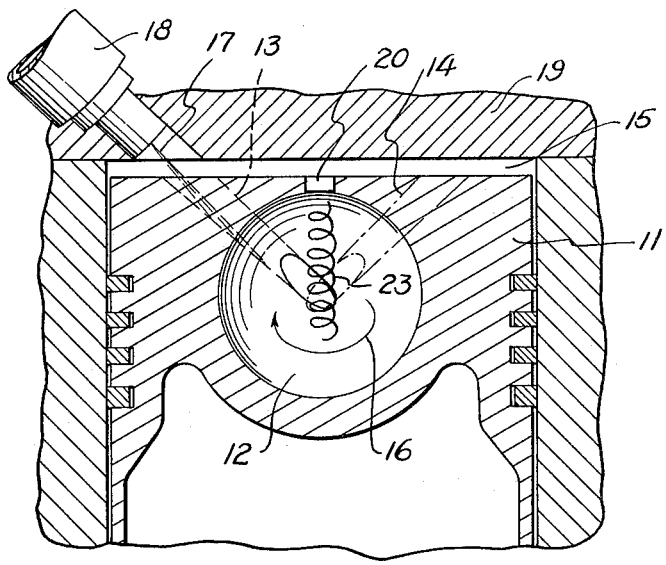
FIGURE 3 is a view similar to FIGURE 1 of a modified form of the invention as taken on the line 3—3 of FIGURE 4.
Figure 4:
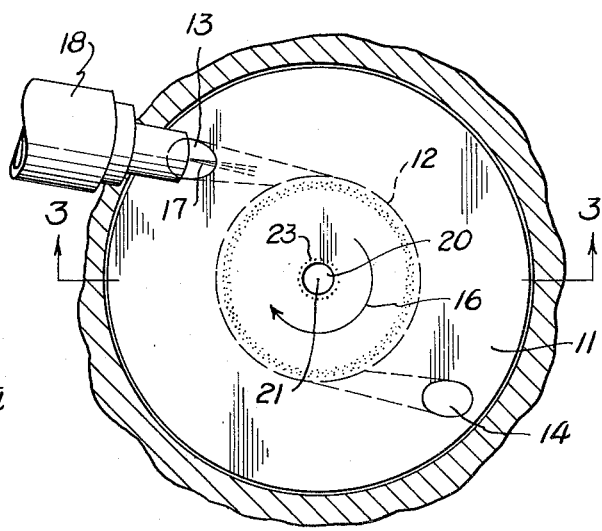
FIGURE 4 is a fragmentary plan view of FIGURE 3.

As shown in FIGURES 3 and 4, the piston 11 contains a combustion chamber 12 in the piston head. Air intake channels 13 and 14 communicate with the cylinder space 15 by extending from the surface of the piston head into chamber 12. These channels tangentially enter chamber 12 so that, during the piston compression stroke, an air swirl 16 is formed concentric with the axis of chamber 12. Liquid fuel 17 is injected from the fuel nozzle 18 mounted in the cylinder head 19 of the chamber 12 when the piston is in the range of its top head center at a time when the opening of channel 13 is directly in line with the fuel nozzle 18. A cylindrical passage 20 forms an opening from the chamber 12 through the cylinder head, this opening being concentric with the axis 21 of chamber 12. The heavier gas portions and fuel particles are driven to the periphery 22 of the air swirl, whereas the lighter gas portions and fuel particles collect in the core 23. The diameter of opening 20 instead of being made large enough to accommodate all the air required for the combustion chamber is, according to this invention, made so small that only a passageway is created for the flow of the core particles from the combustion chamber into the cylinder space. The actual air intake channels for the chamber 12 are the channels 13 and 14. Consequently, the ratio of the total cross-sectional area of channels 13 and 14 to the cross-sectional area of opening 20 is about 1.5 to 1.

The operation of the structure of FIGURES 3 and 4 is as follows:

During the compression stroke of piston 11, the air in the cylinder space 15 flows for the most part through channels 13 and 14 through chamber 12. Because these channels tangentially enter chamber 12, an air swirl is formed around the axis of chamber 12. Fuel injected into chamber 12 toward the end of the compression stroke is separated by centrifugal force so that the cooler air portions and the heavier fuel particles collect at the periphery 22 of the air swirl, while the lighter gas portions and fuel particles or intensely heated gas portions are forced toward the axis 21 of the air swirl. These lighter portions and particles in the core 23 flow as the compression of piston 11 increases directly through opening 20 into the cylinder space 15 so that they can be mixed in time with the oxygen still present in the cylinder space for the complete combustion thereof.

Figure 5:
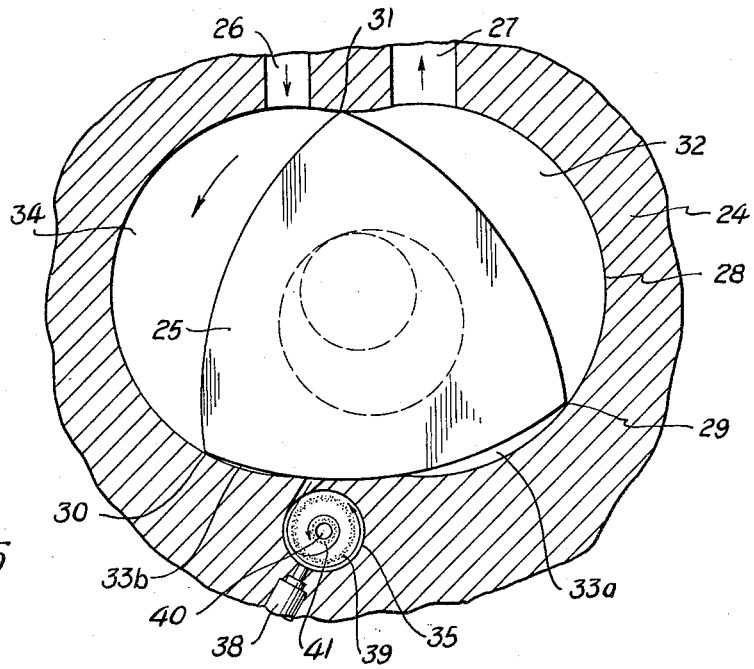
FIGURE 5 is a longitudinal section through an injection-type "rotary piston" engine.
Figure 6:
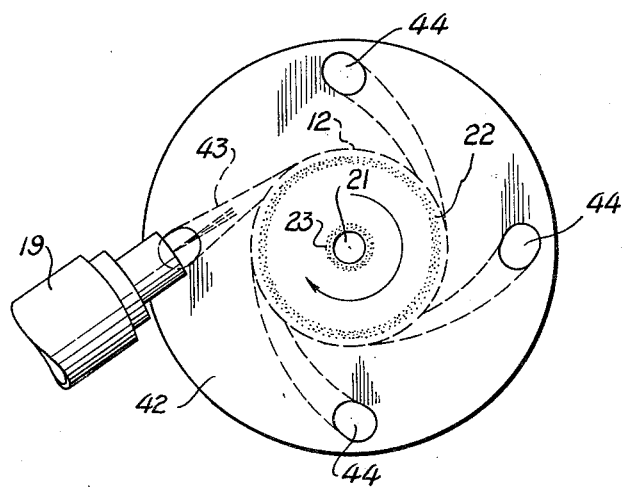
FIGURE 6 is another top view of the piston crown of a reciprocating internal combustion engine where several passages are provided to admit air and for the injection of fuel.

FIGURE 5 is a longitudinal section through a "rotary piston engine" which is defined as an internal combustion engine of the positive displacement type having a rotor 25 performing an epicyclic motion in the direction of the arrow in a trochoidal casing 24. Casing 24 has an air inlet port 26 and an exhaust port 27. Due to the epicyclic motion of the rotor 25 which basically has a shape of an equilateral triangle with arc-shaped sides whose apices 29, 30 and 31 remain in contact with the curved part of the trochoid 28 three crescent-shaped chambers 32, 33a and 33b and 34 of variable volume are formed in which the individual stages of the four-stroke cycle take place successively. The epicyclic motion of the rotor 25 is brought about by mounting it eccentrically relative to the main shaft 35 of the engine and by having it rotate additionally about its own axis so that it orbits about the centre of symmetry of the casing in such a manner that the apices of the rotor are maintained in contact with the casing. A combustion chamber 35 is provided in the body of the casing 24 and communicates with the sub-chamber 33b through a restricted passage 36. 37 is the node which subdivides the compression space into the two sub-chambers 33a and 33b. These two sub-chambers communicate with each other through recesses provided in the arc-shaped flanks of the rotor. As soon as apex 30 has moved beyond the passage 36 the compressed air will flow into the combustion chamber 35. If liquid fuel is injected by means of nozzle 38 into the combustion chamber 35 the tangential disposition of the transfer channel and the vigorous air swirl produced in this manner and the resulting centrifugal action will also cause the lighter and heavier fractions of the gas volume and the fuel particles to separate in such a manner that in this case too the heated air not yet involved in combustion and the heavier fuel particles will essentially segregate on the periphery 39 of the air swirl. On the other hand, any particles of a lighter specific gravity will be displaced towards the axis of the swirl 41 which is proposed to be connected in this case with the sub-chamber 33b by ancillary passages not shown here similar as in the arrangement exemplified by FIGURE 2. In the plan view of the piston 42 containing a combustion chamber 12 in the shape of a body of revolution as shown in FIGURE 6 a separate passage 43 is provided for the injection of fuel by the nozzle 19, this passage being essentially straight and arranged tangentially relative to the combustion chamber 12. In addition, there are three air ports 44 provided in the piston crown which are curved radially and, in addition, may be helical in the direction of the longitudinal axis. In this example, same as in FIGURE 4, the heavier fuel fractions are numbered 22, the swirl axis 21 and the fractions at the centre of the swirl 23.

Having now described the means by which the objects of the invention are obtained,

I claim:

1. In an internal combustion engine having cylinder and piston structures constructed and arranged to provide a cylinder space for the movement of a piston therein, a combustion chamber and port means through which from about 40 to 100% of the air compressed in the cylinder structure enters the combustion chamber during the compression stroke of the piston tangentially of said chamber to cause an air swirl about the core of said chamber, means for injecting liquid fuel onto the wall of said chamber, and passage means extending from the core area of the air swirl in said chamber to said cylinder space for the transfer of burning fuel from said chamber to said cylinder space.

2. In an engine as in claim 1, said passage means being extended from the axis of rotation of said air swirl about said core area.

3. In an engine as in claim 2, said passage means having a smaller cross-sectional area than said port means and in the ratio of about 1 to 1.5.

4. In an engine as in claim 3, said engine comprising a rotary piston engine having a rotor with a sealing strip, and said passage means having a cross-sectional area opening into said cylinder space which is smaller when in the plane perpendicular to the sealing strip than when in the plane parallel to said strip.

5. In an engine as in claim 1, said engine comprising a reciprocating piston engine having said combustion chamber in said piston co-axial therewith; said port means comprising a plurality of channels extending from adjacent the periphery of the surface of the piston head into said chamber tangentially of the wall of said chamber for producing an air swirl in and around the axis of said chamber during the compression stroke of said piston; and said passage means comprising a circular opening through the piston head concentric with said axis.

6. In an engine as in claim 5, said channels being positioned for the simultaneous introduction of both air and fuel into said chamber.

7. In an engine as in claim 6, further comprising a separate fuel injection channel extending from the surface of said piston into said chamber.

8. In an engine as in claim 7, said channels being curved in the direction of the air swirl in said chamber.

9. In an engine as in claim 5, said channels being conically tapered toward said chamber.

References Cited in the file of this patent

UNITED STATES PATENTS

| | | |
|---|---|---|
| 1,759,161 | Lang | May 20, 1930 |
| 2,925,070 | Meurer | Feb. 16, 1960 |
| 2,979,044 | Yamade et al. | Apr. 11, 1961 |

FOREIGN PATENTS

| | | |
|---|---|---|
| 639,889 | France | Mar. 17, 1928 |